Figure 1:
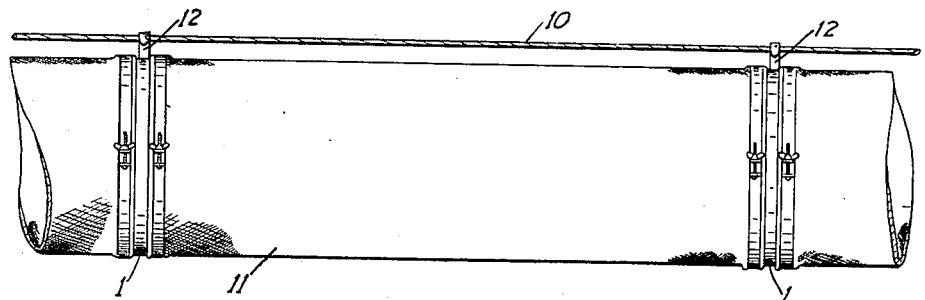

Aug. 17, 1937.　　　　　W. E. BROWN　　　　　2,089,940
COUPLING DEVICE FOR COLLAPSIBLE TUBES
Filed July 17, 1935

INVENTOR.
Wallace E. Brown
BY Walter C. Wheeler
ATTORNEY.

Patented Aug. 17, 1937

2,089,940

UNITED STATES PATENT OFFICE 2,089,940

COUPLING DEVICE FOR COLLAPSIBLE TUBES

Wallace E. Brown, Fairfield, Conn., assignor to E. I. du Pont de Nemours & Company, Wilmington, Del., a corporation of Delaware Application July 17, 1935, Serial No. 31,843

2 Claims. (Cl. 285—84)

This invention relates to coupling devices for joining the ends of tubing and especially to a coupling device for collapsible tubing which may be readily detached from the tubing and easily assembled therewith in service.

Heretofore various types of coupling devices have been used to join lengths of duck or collapsible tubing end to end. One of these devices comprises deformable rings mounted at the ends of the tubing, constructed integrally with the tubing. The lengths are connected by deforming the ring at the end of one tube section and disposing it within the ring at the end of another tube section and then permitting the ring to assume its original shape in a position such that the inner edges of the rings are adjacent and parallel. Thus the outer tubing is expanded more or less near its end ring and the other is contracted so that the tube ends will not be disengaged. Although this type of coupling has been used extensively, it is not entirely satisfactory since the tubes may uncouple during operation, the coupling obstructs the flow of fluid, the joint is more or less loose and is apt to leak, and the tubing can move more or less at the joints and it is subject to excessive wear at these points. When a tube is damaged at the end but otherwise undamaged, the entire length has to be replaced because the coupling ring is constructed integrally with the tubing and the tube cannot be conveniently spliced. This and other types of couplings are not well adapted for conveying fluids at high pressures, and other types have exposed edges which wear holes in the tubing. For these and other reasons, it is desirable to provide an improved device for coupling collapsible tubing.

It is an object of the present invention to provide an improved coupling ring which will avoid the objections of the devices of the prior art.

Another object of the invention is to provide an improved coupling for collapsible tubes which will provide a strong reinforcement for the tube in the coupled position so as to adapt the assembly for carrying high pressure streams of fluids.

A further object of the invention is to provide a detachable coupling for collapsible tubes which will permit the adjoined ends of the tubes to be connected in such a way that a smooth and unobstructed interior and exterior surface will be presented, thus eliminating resistance to the flow of fluids through the tubing.

Another object of the invention is to provide a detachable coupling which is substantially airtight when the coupling is made up, thereby reducing to a negligible degree the losses of fluid at the joints.

These objects and others which will appear in connection with the following description are accomplished generally by providing a device composed of thin strong material, having outwardly extending beads or bearing members therearound, and spacing the beads to accommodate straps which are adapted to clamp the ends of the tubing and hold them in juxtaposition between the straps and the beaded member.

Figure 6:
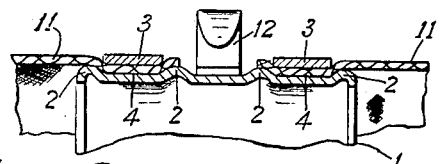
Figure 2:
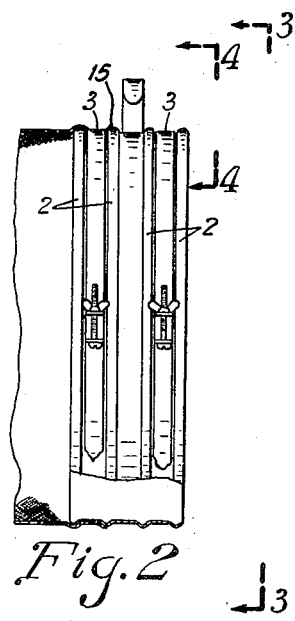
Figure 3:
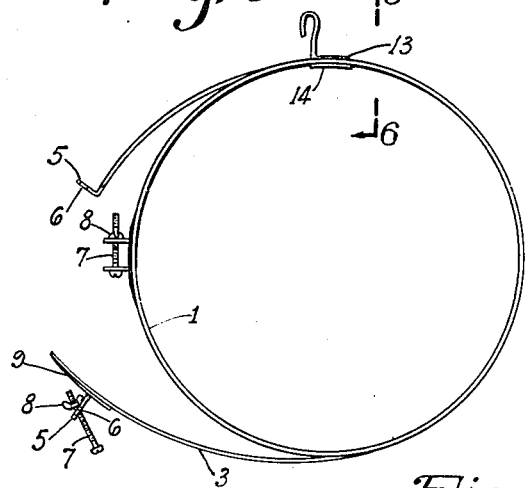
Figure 4:
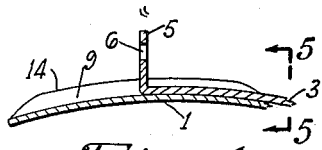
Figure 5:
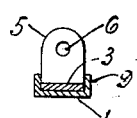

For convenience and in no sense of limitation, the invention is illustrated in the drawing constituting a part hereof, in which Figure 1 is a side elevational view of a pipe showing lengths of collapsible tubing assembled together by means of the coupling device of this invention, Figure 2 is a side elevational view the coupling, Figure 3 is an end elevational view of the coupling with one strap partially removed, Figure 4 is an enlarged cross sectional view of the ring taken along the line 4—4 of Figure 2, Figure 5 is a cross sectional view of the ring taken along the line 5—5 of Figure 4, and Figure 6 is a cross sectional view taken along the line 6—6 of Figure 3 showing the disposition of the parts and the manner in which the ends of the tubing are disposed in coupled position.

The coupling comprises a ring band or cylinder I which is composed of thin strong sheet metal capable of being pressed or drawn so that beading can be formed in the metal. The cylindrical strip of metal is joined at the ends and welded together so as to form a smooth inner surface of the band, and the peripheral projections or beads 2 are rolled into the cylinder. The beads 2 are pressed from within so as to form outwardly extending cylindrical bearing members over which the ends of the collapsible tubing may be drawn. Beads are formed at or near the edges of the cylinder to provide bearing means and means for retaining the straps 3 on the ring. Other beads are suitably spaced inwardly from the ends to provide bearing means and a track 4 for the straps 3, slightly wider than the straps. A space between the latter beads is provided for mounting a suspension member which will hereinafter be described.

The straps 3 are adapted to encircle the cylinder in the track 4 and portions at the ends of the straps are bent outwardly to form ears 5 in which openings 6 are provided. The ends of the straps are held together and tightened around the track portions 4 of the holder by passing the threaded bolt 7 through the openings 6 and the wing nuts 8 are brought down on the opposite ear to tighten the straps in place and clamp the ends of the tubing around the ring. At one end of the strap is attached a short thin channel shaped member or guide member 9. The member 9 projects beyond the bend in the strap and extends upwardly around the edges of the strap 3 so that it will bridge the space between the ends of the strap when it is wrapped around the collar I. The upstruck projections 14 on the guide accommodate the other ends of the straps to hold the ends of the strips 3 in alignment, and they slide over the flexible tubing so that the tubing will be caused to shrink around the collar 1 without forming wrinkles and leakage openings. This action of the guide strips results in a uniform peripheral shrinkage of the tubing around the inner collar 1 and prevents leakage.

In the use of collapsible tubing, it is desirable to provide means for suspending the assembled tubing in order to avoid sagging and kinking. For this purpose, it is convenient to run a suspended cable, such as the cable 10 as shown in Figure 1 lengthwise of the pipe and to attach some form of suspension means to the cable. The collapsible pipe is sometimes suspended by wires or rope, which are passed around the tubing and attached to the cable but this means of support has not been found to be entirely satisfactory.

The tubing or pipe 11 can be conveniently suspended from the couplings which are made in accordance with my invention.

A suspension member 12 is mounted between the inner beads of the collar 1 at a point intermediate the ends of the collar and in such a way that it will project outwardly from the collar without interfering with the ends of the adjacent lengths of hose which are brought together. The suspension member 12 is desirably formed with a foot portion 13, which is made to conform to the outer surface of the collar and may be attached thereto by welding or riveting. A desirable and somewhat stronger means of attachment may comprise a plate 14 which is fitted to the inside of the collar 1 opposite the footing 13. By welding or riveting the plate, foot member and collar together, a reinforced rigid mounting is provided. The outer end of the suspension member 13 may desirably be made in the form of a hook so that it can be passed over a cable, spike or other suspension means, but other convenient end conformations of the suspension member can be provided.

The beaded collar 1 is made so that the ends of the tubing can be passed over the beads more or less snugly. The ends of the tubing 11 are brought over the inner beads, approximately to the point 15 as indicated in Figure 2, so that when the clamping bands 3 are applied, the tubing will be contracted snugly and uniformly around the outer beading, between the outer and inner beads and against a cylindrical portion of the collar between the beads. When the adjacent ends of the tubing to be joined are brought together in this manner, there results a reverse bending of the walls of the tubing as shown in Figure 6 and the tubing cannot be separated from the connection unintentionally. The uniform contraction of the tubing as affected by the action of the extension 9 and the straps 3 positively prevents wrinkling of the tubing and leakage through the couplings.

The thin collar member 1 which is disposed on the inside of the assembled tubing provides a non-collapsible, unobstructed, smooth joint for the flow of fluids in the tube. When the tube sections are joined in this manner, end to end, they may be suspended from the cable 10 as shown in Figure 1 by passing the hook member 12 over the cable. The tubing can be uncoupled easily and quickly by loosening only one of the clamping bands and withdrawing the inner collar from the end of one of the tubes.

Sheet metal is a convenient construction material from which to make the coupling but other materials having sufficient strength, flexibility and ability to retain a given shape can be used. The coupling may not necessarily be circular in form since it may be elongated or otherwise shaped. Various means for securing the straps around the ring, such as spring operated clamps, lock nuts and screws, tension operated buckle clamps, twisted wire rope and others can be used.

The invention is especially useful for coupling any kind of collapsible hose or tubing, whether flexible or nonflexible, such as the rubber coated fabrics which are used extensively in mines, tunnels and underground excavations for carrying ventilating air. It can be used for making repairs and replacements in damaged lines or in other places where odd lengths of tubing may be required, and for other purposes.

It will be observed that couplings may be of light weight, strong material, and that fluid tightness and freedom from unintended uncoupling can be assured. The interior of the conduits in which the couplings of this invention are used have a uniform unobstructed internal opening which does not obstruct the flow of fluid through the conduit.

Although the invention has been described with reference to a typical embodiment of the invention, it is to be understood that various modifications can be made without departing from the invention, and that no limitations are intended in the annexed claims except those which are specifically recited or are imposed by the prior art.

I claim:

1. A hose coupling which comprises a continuous band adapted to be disposed within and extend between the ends of tubing which are to be connected, outstruck means for bearing against the inner surfaces of the tubing, said means being spaced apart to form an intermediate circumferential surface and circumferential surfaces on both sides thereof, straps for contracting the tubing around the side circumferential surfaces, and suspension means extending from the intermediate surface of the band.

2. A coupling for tubing incapable of self-distension comprising a cylindrical member adapted for insertion in the ends of the sections of tubing to be coupled and two flat highly flexible clamping straps adapted to be disposed around the outside of the pieces of tubing to be coupled and to press them peripherally against the said cylindrical member, the said cylindrical member having external beading defining longitudinal spaced flat bottomed transverse grooves adapted to receive the clamping straps, the ends of each clamping strap being bent outwardly and adapted to receive an adjustable connecting means capable of drawing the ends of the strap toward each other, one end of each clamping strap being attached on its underside to a channel member whose sides extend outwardly along the edges of the clamping strap, the said channel member extending beyond the turned end of the clamping strap to which it is attached and under the opposite end of the clamping strap when in clamping position and adjustable connecting means connecting the opposite ends of each clamping strap.

WALLACE E. BROWN.